United States Patent
Lin et al.

(10) Patent No.: US 9,727,821 B2
(45) Date of Patent: Aug. 8, 2017

(54) SEQUENTIAL ANOMALY DETECTION

(71) Applicant: International Business Machines Corporation, Armonk, NY (US)

(72) Inventors: Ching-Yung Lin, Forest Hills, NY (US); Yale Song, Brighton, MA (US); Zhen Wen, Springfield, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 664 days.

(21) Appl. No.: 13/969,151

(22) Filed: Aug. 16, 2013

(65) Prior Publication Data

US 2015/0052090 A1    Feb. 19, 2015

(51) Int. Cl.
*G06N 5/02* (2006.01)
*G06N 99/00* (2010.01)
*G06N 7/00* (2006.01)

(52) U.S. Cl.
CPC ............ *G06N 7/005* (2013.01); *G06N 5/022* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 6,275,942 B1 | 8/2001 | Bernhard et al. | |
| 6,742,124 B1 | 5/2004 | Kilpatrick et al. | |
| 7,225,343 B1 * | 5/2007 | Honig | G06F 21/554 |
| | | | 713/189 |
| 7,310,590 B1 | 12/2007 | Bansal | |
| 7,424,619 B1 | 9/2008 | Fan et al. | |
| 7,562,814 B1 | 7/2009 | Shao et al. | |
| 7,567,878 B2 * | 7/2009 | Yuan | G05B 19/4065 |
| | | | 702/81 |
| 7,613,668 B2 | 11/2009 | Hoglund et al. | |
| 7,792,770 B1 | 9/2010 | Phoha | |
| 7,853,433 B2 | 12/2010 | He et al. | |
| 7,941,382 B2 | 5/2011 | Stokes et al. | |
| 8,086,017 B2 * | 12/2011 | He | G06K 9/00 |
| | | | 356/71 |
| 8,116,575 B1 | 2/2012 | Saisan et al. | |
| 8,140,450 B2 | 3/2012 | Porikli et al. | |

(Continued)

OTHER PUBLICATIONS

Lafferty et al., "Conditional Random Fields: Probabilistic Models for Segmenting and Labeling Sequence Data", Proceedings of the 18th International Conference on Machine Learning 2001 (ICML 2001), pp. 282-289.*

(Continued)

*Primary Examiner* — Kakali Chaki
*Assistant Examiner* — Fuming Wu
(74) *Attorney, Agent, or Firm* — Daniel P. Morris; Otterstedt, Ellenbogen & Kammer, LLP

(57) ABSTRACT

A dataset including at least one temporal event sequence is collected. A one-class sequence classifier f(x) that obtains a decision boundary is statistically learned. At least one new temporal event sequence is evaluated, wherein the at least one new temporal event sequence is outside of the dataset. It is determined whether the at least one new temporal event sequence is one of a normal sequence or an abnormal sequence based on the evaluation. Numerous additional aspects are disclosed.

19 Claims, 6 Drawing Sheets

(56) References Cited

U.S. PATENT DOCUMENTS

| | | | |
|---|---|---|---|
| 8,155,960 B2 | 4/2012 | Hakkani-Tur et al. | |
| 8,170,868 B2* | 5/2012 | Gamon | G06F 17/27 704/1 |
| 8,219,511 B2 | 7/2012 | Yang et al. | |
| 8,234,525 B2 | 7/2012 | Dattathrani | |
| 8,275,722 B2 | 9/2012 | Jhala et al. | |
| 8,285,667 B2 | 10/2012 | Jaros et al. | |
| 8,396,286 B1* | 3/2013 | Aradhye | G06K 9/66 382/159 |
| 8,527,432 B1* | 9/2013 | Guo | G06N 99/005 706/12 |
| 8,533,134 B1* | 9/2013 | Zhao | G06F 17/30705 706/12 |
| 8,819,024 B1* | 8/2014 | Toderici | G06F 17/30731 707/740 |
| 8,856,051 B1* | 10/2014 | Song | G06N 99/005 706/12 |
| 8,990,134 B1* | 3/2015 | Snoek | G06K 9/00697 706/45 |
| 2004/0205474 A1* | 10/2004 | Eskin | H04L 63/1416 713/188 |
| 2006/0015263 A1* | 1/2006 | Stupp | G06F 17/18 702/19 |
| 2008/0071721 A1 | 3/2008 | Wang | |
| 2008/0112593 A1 | 5/2008 | Ratner | |
| 2008/0292194 A1* | 11/2008 | Schmidt | G06T 7/0012 382/217 |
| 2011/0002531 A1 | 1/2011 | Heisele et al. | |
| 2012/0072029 A1* | 3/2012 | Persaud | G06N 5/04 700/276 |
| 2012/0283574 A1* | 11/2012 | Park | G06K 9/46 600/476 |
| 2014/0019118 A1* | 1/2014 | Tromp | G06F 17/274 704/9 |
| 2014/0165140 A1* | 6/2014 | Singla | G06F 11/3006 726/1 |
| 2014/0201126 A1* | 7/2014 | Zadeh | G06K 9/627 706/52 |
| 2015/0052090 A1* | 2/2015 | Lin | G06N 7/005 706/12 |
| 2016/0035093 A1* | 2/2016 | Kateb | A61B 5/0042 382/131 |
| 2017/0061322 A1* | 3/2017 | Chari | G06N 99/005 |

OTHER PUBLICATIONS

Laxhammar, "Anomaly Detection in Trajectory Data for Surveillance Applications," Studies from the School of Science and Technology at Orebro University 19, 2011.*

Eberle, "Insider Threat Detection Using a Graph-Based Approach," 90 pp., 2011.*

Grace Period Disclosure: One-Class Conditional Random Fields for Sequential Anomaly Detection, Yale Song, Zhen Wen, Ching-Yung Lin, Randall Davis, made available on the world wide web on or about Apr. 2, 2013, pp. 1-7.

Lu, H. et al.; "A co-training framework for visual tracking with multiple instance learning"; Proceedings 2011 IEEE International Conference on Automatic Face & Gesture Recognition (FG 2011), pp. 539-544, IEEE; 2011.

Ahmed, T. et al.; "Machine Learning Approaches to Network Anomaly Detection"; Proceeding SYSML'07; Proceedings of the 2nd USENIX Workshop on Tacking Computer Systems Problems with Machine Learning Techniques; Article #7, 2007. pages 1-6.

Zhang, Y. et al.; "Adaptive and Online One-Class Support Vector Machine-based Outlier Detection Techniques for Wireless Sensor Networks"; 2009 International Conference on Advanced Information Networking and Application Workshops; IEEE, 2009, p. 990-995.

Lane, T. et al.; "Temporal Sequence Learning and Data Reduction for Anomaly Detection"; ACM Transactions on Information and System Security, vol. 2, No. 3, pp. 295-331, Aug. 1999.

Naphade, MR. et al.; "Learning to annotate video database"; Proceedings of teh SPIE—The International Society for Optical Engineering, vol. 4676, pp. 264-275, 2001.

Nappi, M. et al.; "Robust Re-Identification Using Randomness and Statistical Learning: Quo Vadis"; Pattern Recognition Letters, vol. 33, No. 14, pp. 1820-1827, Oct. 15, 2012.

Xin Xu, Sequential anomaly detection based on temporal-difference learning: Principles, models and case studies, Applied Soft Computing 10 (2010) 859-867.

David M. Blei et al, "Latent Dirichlet Allocation", Journal of Machine Learning Research 3 (2003), Published Jan. 2003.

Naoki Abe et al, "Outlier Detection by Active Learning". KDD'06 Aug. 20-23, 2006, Philadelphia, Pennsylvania, USA, p. 504-509.

Avrim Blum et al, "Combining Labeled and Unlabeled Data with Co-Training". COLT 1998 Madison WI USA, p. 92-100.

Markus M. Breunig et al, "LOF: Identifying Density-Based Local Outliers". MOD 2000, Dallas, TX USA © ACM 2000, p. 93-104.

Varun Chandola et al, "Anomaly Detection: A Survey". ACM Comput. Surv. 41, 3,Article 15 (Jul. 2009) p. 15:1-15:58.

Varun Chandola, "Anomaly Detection for Symbolic Sequences and Time Series Data". In Partial Fulfillment of the Requirements for the Degree of Doctor of Philosophy Sep. 2009 p. i-xiv, 1-156.

Chih-Chung Chang et al, "LIBSVM: A Library for Support Vector Machines". ACM Trans. Intell. Syst. Technol. 2, 3, Article 27 (Apr. 2011), p. 27:1-27.

Chen, Ning, Jun Zhu, and Eric P. Xing. "Predictive subspace learning for multi-view data: a large margin approach." Advances in neural information processing systems. 2010, p. 1-9.

Haibin Cheng et al, "Detection and Characterization of Anomalies in Multivariate Time Series". SDM, 2009, p. 413-424.

C. Mario Christoudias et al, "Multi-View Learning in the Presence of View Disagreement". Appears in Proceedings of be Twenty-Fourth Conference on Uncertainty in Artificial Intelligence (UAI2008) p. 1-9.

Trinh-Minh-Tri Do et al, "Regularized Bundle Methods for Convex and Non-Convex Risks". Journal of Machine Learning Research 13 (2012) p. 3539-3583.

Charles Elkan et al, "Learning Classifiers from Only Positive and Unlabeled Data". KDD'08, Aug. 24-27, 2008 p. 213-220.

Pedro F. Felzenszwalb et al, "Object Detection with Discriminatively Trained Part Based Models". Sep. 2010 Pattern Analysis and Machine Intelligence, IEEE p. 1-20.

Alireza Ghasemi et al, "A Bayesian Approach to the Data Description Problem". 2012, Association for the Advancement of Artificial Intelligence. p. 907-913.

David R. Hardoon et al, "Canonical Correlation Analysis: An Overview with Application to Learning Methods". Neural Computation16, p. 2639-2664 (2004).

Jingrui HE et al, "An effective framework for characterizing rare categories". Front. Comput. Sci., 2012 p. 154-165.

Haibo He et al, "Learning from Imbalanced Data". IEEE Transactions on Knowledge and Data Engineering, vol. 21, No. 9, Sep. 2009 p. 1263-1284.

Jingrui He et al, "A Graph-based Framework for Multi-Task Multi-View Learning". Appearing in Proceedings of the 28th International Con-ference on Machine Learning, Bellevue, WA, USA, 2011 p. 1-8.

John Lafferty et al, "Conditional Random Fields: Probabilistic Models for Segmenting and Labeling Sequence Data". The definitive version was published in Proceedings of the 18th International Conference on Machine Learning 2001 (ICML 2001). p. 1-8.

John Lafferty et al, "Kernel Conditional Random Fields: Representation and Clique Selection". Appearing in Proceedings of the 21st International Conference on Machine Learning, Banff, Canada, 2004. p. 1-8.

Zicheng Liao et al, "Anomaly Detection in GPS Data Based on Visual Analytics". IEEE Symposium on Visual Analytics Science and Technology Oct. 24-29, 2010, Salt Lake City, Utah, USA. p. 51-58.

Ching-Yung Lin et al, "Social Network Analysis in Enterprise". Sep. 2012, Proceedings of the IEEE p. 2759-2776.

(56) References Cited

OTHER PUBLICATIONS

Zhiyuan Liu et al, "PLDA+: Parallel Latent Dirichlet Allocation with Data Placement and Pipeline Processing". ACM Trans. Intell. Syst. Technol. 2, 3, Article 26 (Apr. 2011), p. 26:1-18.
Larry M. Manevitz et al, "One-Class SVMs for Document Classification". Journal of Machine Learning Research 2 (2001) p. 139-154.
Emanuel Parzen"On Estimation of a Probability Density Function and Mode". Annals of Mathematical Statistics, vol. 33, Issue 3, (Sep. 1962) p. 1065-1076.
E.K. Patterson et al, "Cuave: A New Audio-Visual Database for Multimodal Human-Computer Interface Research". 2002, IEEE p. II-2017 to II-2020.
Judea Pearl, "Reverend Bayes on Inference Engines: A Distributed Hierarchical Approach". AAAI-82 Proceedings. Copyright © 1982. p. 133-136.
Pelleg, Dan, and Andrew W. Moore. "Active learning for anomaly and rare-category detection." Advances in Neural Information Processing Systems. 2004. p. 1-8.
Jian Peng et al, "Conditional Neural Fields". Advances in Neural Information Processing Systems (NIPS), Dec. 2009 p. 1-9.
Ariadna Quattoni et al, "Hidden Conditional Random Fields". IEEE Transactions on Pattern Analysis and Machine Intelligence, vol. 29, No. 10, Oct. 2007. p. 1848-1853.
Lawrebce Rabiner, "A Tutorial on Hidden Markov Models and Selected Applications in Speech Recognition". Proc. IEEE Feb. 1989, IEEE p. 257-286.
Kate Saenko et al, "An Asynchronous DBN for Audio-Visual Speech Recognition". Spoken Language Technology Workshop, 2006. IEEE p. 1-4.
Bernhard Sch¨olkopf et al, "Estimating the Support of a High-Dimensional Distribution". Neural Comput. Jul. 2001 p. 1-30.
Yale Song et al, "Tracking Body and Hands for Gesture Recognition:NATOPS Aircraft Handling Signals Database". FG 2011, IEEE. p. 500-506.
Yale Song et al, "Multi-View Latent Variable Discriminative Models for Action Recognition". Appeared in IEEE Conference on Computer Vision and Pattern Recognition (CVPR) 2012. p. 1-8.

Yale Song et al. "Multimodal Human Behavior Analysis: Learning Correlation and Interaction Across Modalities". ICMI'12, Oct. 22-26, 2012, Santa Monica, California, USA. p. 1-4.
Yale Song et al, "One-Class Conditional Random Fields for Sequential Anomaly Detection". International Joint conference on Artificial Intelligence (IJCAI) 2013. p. 1-7.
Yale Song et al, "Distribution-Sensitive Learning for Imbalanced Datasets". IEEE International Conference on Automatic Face and Gesture Recognition (FG) 2013. p. 1-6.
Pei Sun et al, "Mining for Outliers in Sequential Databases". In Proceedings of SDM. 2006. p. 94-105.
Swee Chuan Tan et al, "Fast Anomaly Detection for Streaming Data". Proceedings of the Twenty-Second International Joint Conference on Artificial Intelligence,Barcelona, Catalonia, Spain, Jul. 16-22, 2011 p. 1511-1516.
David M.J. Tax et al, "Support Vector Data Description". Machine Learning, 54, p. 45-66, 2004. 2004 Kluwer Academic Publishers.
Choon Hui Teo et al, "Bundle Methods for Regularized Risk Minimization". Journal of Machine Learning Research 11 (2010) p. 311-365.
Ioannis Tsochantaridis et al, "Support Vector Machine Learning for Interdependent & Structured Output Spaces". Appearing in Proceedings of the 21 st International Conference on Machine Learning, Banff, Canada, 2004 p. 1-8.
Chun-Nam John Yu et al, "Learning Structural SVMs with Latent Variables". In Proceedings of the 26th International Conference on Machine Learning,Montréal, Québec, Canada, 2009. p. 1-4.
Hong Zhang et al, "Cross-modal Correlation Learning for Clustering on Image-Audio Dataset". ACM MM'07, Sep. 23-28, 2007, Augsburg, Bavaria, Germany p. 273-276.
Goker Erdogan, Outlier Detection Toolbox in Matlab, May 22, 2012, p. 1-4.
Goker Erdogan, Spectral Methods for Outlier Detection in Machine Learning, MS Thesis, Bogazici U., Turkey, 2012, p. i-xvii and 1-93.
Kevin Murphy, Hidden Markov Model (HMM) Tollbox for Matlab, 1998 With Last Updater Jun. 8, 2005, Downloaded From http://www.cs.ubc.ca/~murphyk/Software/hmm/hmm.html p. 1-2.

* cited by examiner

SEQUENTIAL ANOMALY DETECTION

STATEMENT OF GOVERNMENT RIGHTS

This invention was made with Government support under Contract No.: W911NF-11-C-0200 (Defense Advanced Research Projects Agency (DARPA)). The Government has certain rights in this invention.

CROSS-REFERENCE TO RELATED APPLICATIONS

Not Applicable.

STATEMENT REGARDING PRIOR DISCLOSURES BY THE INVENTOR OR A JOINT INVENTOR

The following disclosure(s) are submitted under 35 U.S.C. 102(b)(1)(A):
DISCLOSURE: One-Class Conditional Random Fields for Sequential Anomaly Detection, Yale Song, Zhen Wen, Ching-Yung Lin, Randall Davis, made available on the world wide web on or about Apr. 2, 2013, pages 1-7.

FIELD OF THE INVENTION

The present invention relates to the electrical, electronic and computer arts, and, more particularly, to analytics and optimization, and the like.

BACKGROUND OF THE INVENTION

With the proliferation of social software and platforms, there has been an increase in the number of malicious anomalies, such as insider information leakage, spreading of unwelcome email, rumor dissemination, and planning of inappropriate actions that might raise concerns for law enforcement authorities. Detecting such anomalies is important in many applications. For example, in social media, anomaly detection may provide insight on whether people are propagating truthful or deceptive information. As another example, in organizations, detecting anomalous groups may help to identify poorly performing or malicious personnel, such that organizations may better improve performances and protect themselves against insider threat. Anomaly detection may also help to identify good anomalies, such as innovators who behave differently from the majority of "normal" personnel. Other anomaly detection applications may include inappropriate actions that might raise concerns for law enforcement authorities, network intrusion, engine fault, disease symptoms, and epidemic detection and prevention. In some instances, a sequence of events may seem normal individually, yet appear abnormal only when considered collectively. For example, there may be events showing stress, which may lead to downloading confidential information, which may then lead to the leaking of confidential information to an adversary (abnormal behavior or an anomaly). Or consider a case, for example, where an insider logs into a system late at night, downloads files from an infrequently used server, and copies large amounts of data to a USB drive. Individually, these events may be normal, but when viewed together may be malicious. It may be critical to detect an anomalous sequence before it can have a negative impact.

Existing anomaly detection approaches are mostly based on pre-defined rules and/or pre-labeled instances of anomalies. One-class learning refers to an anomaly detection technique, and uses training data collected from only one known class to predict whether or not a new sample is drawn from the same distribution.

SUMMARY OF THE INVENTION

Principles of the invention provide techniques for sequential anomaly detection. In one aspect, an exemplary method includes the steps of collecting a dataset including at least one temporal event sequence; learning statistically a one-class sequence classifier $f(x)$ that obtains a decision boundary; evaluating at least one new temporal event sequence, wherein the at least one new temporal event sequence is outside of the data set; and determining whether the at least one new temporal event sequence is one of a normal sequence or an abnormal sequence based on the evaluating step.

In another aspect, an exemplary computer program product is provided. The computer program product includes a computer readable storage medium having computer readable program code embodied therewith. The computer readable program code includes computer readable program code configured to: collect a dataset including at least one temporal event sequence; learn statistically a one-class sequence classifier $f(x)$ that obtains a decision boundary; evaluate at least one new temporal event sequence, wherein the at least one new temporal event sequence is outside of the data set; and determine whether the at least one new temporal event sequence is one of a normal sequence or an abnormal sequence based on the evaluating step.

In another aspect, an exemplary apparatus is provided that includes a memory; and at least one processor, coupled to the memory. The at least one processor is operative to collect a dataset including at least one temporal event sequence; learn statistically a one-class sequence classifier $f(x)$ that obtains a decision boundary; evaluate at least one new temporal event sequence, wherein the at least one new temporal event sequence is outside of the data set; and determine whether the at least one new temporal event sequence is one of a normal sequence or an abnormal sequence based on the evaluating step.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

the use of conditional random fields in one-class learning settings

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
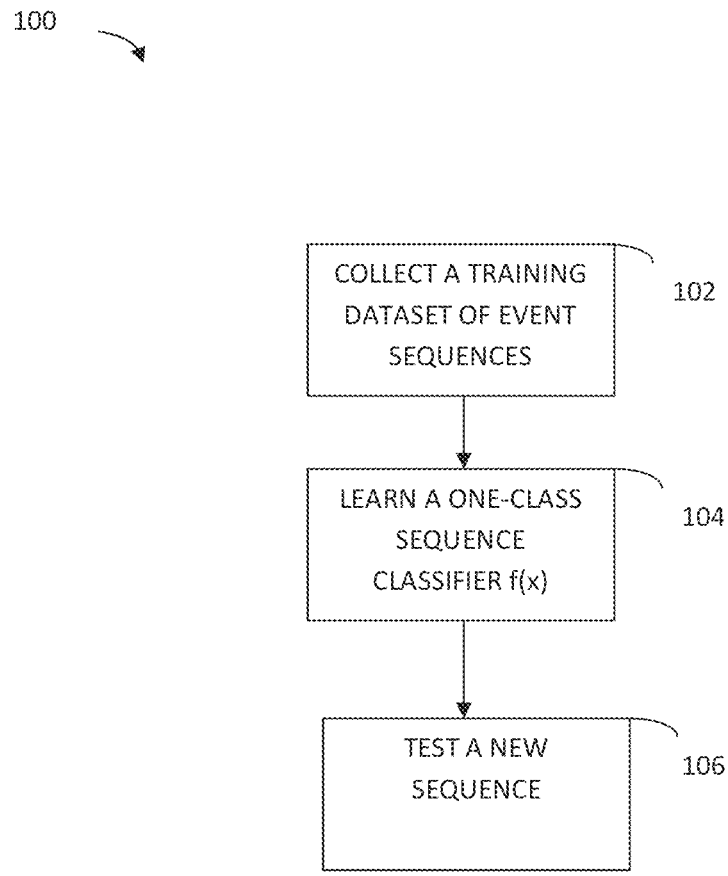
FIG. 1 is a flow chart depicting details of an exemplary method, according to an aspect of the invention.

Sequential anomaly detection may be used in several applications, such as network intrusion detection, video surveillance in public spaces (e.g., monitoring of streets, subway gates, parks, etc.), disease symptom detection (e.g., diagnosis of cancer, depression, etc.), fault detection (e.g., machine, engine, etc.), and detection of inappropriate actions that might raise concerns for law enforcement authorities (e.g., suspicious banking transactions and the like). Sequential anomaly detection may be used in other applications. However, sequential anomaly detection is a challenging problem due to the one-class nature of the data (i.e., data is collected from only one class) and the temporal dependence in sequential data (e.g., an anomalous pattern may be a series of events that are normal individually but abnormal only collectively). Examples of true anomaly sequences may be extremely rare because true anomalies occur infrequently (e.g. rare diseases), and hence are hard to obtain samples from, and details of some examples are confidential or proprietary (e.g., network intrusions). Many anomaly detection methods train a standard model using both positive (normal) and negative (abnormal) data. These methods typically require at least one example from each class (positive and negative) to work properly. Other methods may use one-class data augmented with artificially generated negative samples. However, it is a time consuming and expensive undertaking to generate sequential data. Further, even if there are some examples known as anomalous, they may not represent the underlying distribution of that class accurately, making them unsuitable as training data. For example, malicious hackers may invent new patterns of attack, so a network intrusion detection system trained with only known patterns may not perform reliably on new attacks.

One or more embodiments of the invention provide systems, methods and/or apparatus for sequential anomaly detection. In particular, the one or more embodiments provide for a one-class temporal dynamic sequence classification model ("model"), to detect anomalous sequences in an adaptive and unsupervised fashion, without requiring any negative sample during the learning process. Most, or all, of the training data used in one or more embodiments is from one known class (e.g., the "normal" or positive class). The model learns to detect data from the unknown class (e.g., the "anomalous" or negative class). As such, the model solves the problem of scarce true anomaly samples. In at least some cases, the model includes a temporal dynamics statistical model, and the learning method employed by the model addresses the inter-dependent events in anomalous users' activities. Further, in one or more embodiments, the learning method used by the model is adaptive, as the learning method updates the model as more training data is acquired.

In some embodiments, starting with unsupervised learning, the model performs a classification of the training data and returns to a user a ranked list of the sequences in the training data. The ranking indicates suspicious and/or possibly negative sequences. In some embodiments, domain-expert analysts analyze the list of suspicious sequences and label some of them as true anomaly or as "high risk" for further investigation. In some embodiments, the analysts further supply annotations to a subset of training data or additional relevant feature sets, described further below, during the analytical investigation. One or more embodiments incorporate the annotations to further adapt and refine the learning process to improve detection results. In at least some cases, the annotations and/or insights of the analysts guide the adaptive aspect of the model toward novel behavior that may be of interest, be it malicious or beneficial.

One or more embodiments also provide for iteratively improving the classification performance of the model using active learning algorithms and/or components and multi-view learning algorithms and/or components. In at least some cases, the active learning component actively asks users for labels of some data, to iteratively refine the performance of the learning algorithms. In some instances, the multi-view learning component exploits the relationship among rich and heterogeneous features. In one or more embodiments, employing multi-view learning, the multi-view learning component factorizes feature space into sets of relevant features or "views" (e.g., time-related, graph-related, www-related, file-related), and improves the relationship across different sets. Other suitable relevant features may be used. Identifying the set of relevant features (views) may, in at least some instances, require domain knowledge.

Some embodiments suggest to domain-expert analysts a possible optimal configuration of views (set of relevant features), out of a large amount of possibly relevant features, through the use of canonical correlation analysis, for example. Other suitable analyses can be used to determine a possible optimal configuration of views. In at least some cases, the analysts then review and refine the view configuration. Combined with active learning, in some embodiments, multi-view learning also improves the view configuration iteratively. Compared to other anomaly detection methods which use either active learning or multi-view learning, one or more embodiments combine the two learning methodologies to effectively improve learning performance, especially in one-class settings where true anomaly instances are rare.

FIG. 1 is a flow chart depicting details of an exemplary embodiment of the invention. In particular, an exemplary method 100 for sequential anomaly detection used by a detection module is provided. In Step 102 a training dataset of event sequences are collected. In some cases, the dataset is collected without the need for labeling each observation or event within a sequence. The training dataset includes, for example, one or more temporal data sequences that are from a single known class (one-class). The training data can, in some embodiments, contain true anomalies that have yet to be labeled as anomalous. In the depicted embodiment, after collection, a one-class sequence classifier f(x) ("classifier") is learned in Step 104. The classifier is statistically learned, for example, in a solution space Ω, with a mathematical optimization such that the classifier accepts most of the sequences in the training dataset as normal, while keeping the solution space as tight as possible. As used herein and throughout the application "as tight as possible," in reference to the solution space means that the solution vector has a small norm. In some embodiments, the tightness is determined relatively by two parameters: a user defined parameter, such as a difference threshold, which specifies the minimum difference between whether a sequence is predicted as normal versus abnormal; and $L_2$ norm, which is described further below, for example with respect to Equations 9-11. Keeping the solution space as tight as possible can, in some embodiments, prevent over-fitting or tailoring of the solution to the training data. This is desirable, inasmuch as a solution that is less tailored to the training data is more generalizable to unseen data. In some instances, the higher $L_2$ is set, the smaller the solution set is, which makes the solution set less tailored and therefore more generalizable. In other words, during training, most of the sequences in the training dataset are forced to have a higher probability of being normal. The higher probability may be determined by the user defined parameter, which may dictate the relative importance of the hinge loss and the $L_2$ norm, as will be described further below. During the learning process, the classifier obtains, for example, a decision boundary or threshold as to whether the sequence is normal or abnormal. On one side of the threshold, the sequence is considered or labeled "normal," and on the other side of the threshold, the sequence is considered or labeled "abnormal," or at least labeled as suspicious of being abnormal.

In the example of FIG. 1, in step 106, a new sequence that is not part of the training dataset is tested and/or evaluated by the module. The evaluation uses, for example, the learned classifier to compute a probabilistic distance of the new sequence to the decision boundary or threshold to determine if the temporal events in the sequence can be considered normal or abnormal. If the classifier rejects the new sequence, the sequence is abnormal or an anomaly. In some embodiments, as the module tests new datasets, the module maintains a list of sequences it determines to be suspicious or have a higher likelihood of being an anomaly. In some embodiments, the module ranks the list of suspicious sequences, which are then reviewed by a domain analyst to determine whether the sequence is actually abnormal (true anomaly data) or normal. In other embodiments, the module ranks all of the sequences in the dataset. The ranking indicates suspicious and/or possibly negative sequences, which are then reviewed by a domain analyst to determine whether the sequence(s) is/are actually abnormal (true anomaly data) or normal. In at least some cases, the analyst's determination with regard to the reviewed particular sequence is input into the system to update the training dataset, and the classifier is further refined or retrained to provide a more accurate anomaly detector, while, in some cases, keeping the learning approximately independent of a highly imbalanced dataset.

Figure 2:
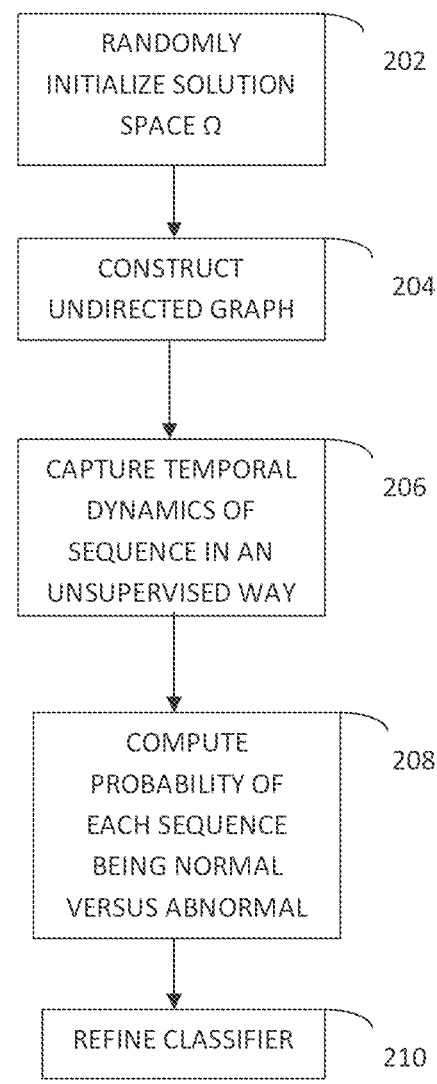
FIG. 2 is another flow chart depicting details of an exemplary method, according to an aspect of the invention.

FIG. 2 is a flowchart of an exemplary method 200 for statistically learning the classifier described above with respect to FIG. 1. In step 202, the solution space Ω is randomly initialized. Then, an undirected graph (e.g., time-series sequence) for each sequence in the training dataset is constructed in step 204. Other suitable undirected graphs may be used. In some cases, the undirected graph includes additional "latent" random variables, which teach the hidden "temporal" dynamics of the data. Each latent variable is, for example, associated with each event or observation in the sequence. The latent variables can be, in some instances, a set of additional random variables with a fixed dimension, which do not have an observation therewith. Each random variable is, in some cases, associated to each observation, and introduced to learn the dynamics in each sequence.

In step 206, a posterior distribution of the latent variables is statistically inferred to capture the temporal dynamics of the sequence in an unsupervised manner. This inference captures, for example, hidden temporal dynamics in an unsupervised fashion. Then, in step 208, the probability of each sequence being normal versus abnormal is computed by marginalizing over the posterior distribution of the latent variables. By marginalizing over the posterior distribution of the latent variables, in one or more embodiments, the model is optimized such that latent labeling is maximally discriminative between "normal" and "abnormal," which in effect is unsupervised learning. In other words, in at least some cases, the model is optimized such that the latent variable associated with each event is used to distinguish between "normal" and "abnormal," and each event does not need to be labeled manually. One of the benefits of this aspect is that, in one or more embodiments, it saves time and/or expense, inasmuch as labeling events is typically a time consuming and expensive endeavor.

In step 210, the classifier is refined by repeating steps 202-208 until a termination criterion is satisfied. Repeating steps 202-208 until a termination criterion is satisfied includes, for example, enforcing most sequences to have a higher probability of being "normal," while keeping the solution space as tight as possible. In some embodiments this higher probability may be compared to a user set parameter, such that P(normal)−P(abnormal)>user set parameter. In some embodiments, the enforcement includes accumulating a misclassification error for each sequence $x_i$, $\Delta_i = \rho - (p(\text{normal}|x_i) - p(\text{abnormal}|x_i))$ with a user defined free parameter $\rho \in (0,1)$; and computing the objective value $$L(w) = \frac{\lambda}{2}\|w\|^2 - \frac{1}{N}\sum_{i=1}^{N}\Delta_i$$

and minimizing L(w) over w using mathematical optimization, therefore keeping the solution space as tight as possible.

As described above, one or more embodiments provide for learning a classifier in an unsupervised manner. The benefit of this is that negative samples are not required during the learning process. While most sequences in the dataset are positive, in some instances, some sequences are negative, although they do not have ground truth labels. In some embodiments, unsupervised learning of a classifier from the following one-class training dataset $D=\{(x_i, y_i)|x_i \in \mathbb{R}^{d \times t_i}, y_i=+1\}_{i=1}^N$ is described as follows, where all of the samples or sequences in the training dataset are assumed to have positive labels, but do not have ground-truth labels. As used herein, ground truth labels are labels that are known to be true, and not just assumed. The input domain X includes multivariate time-series data, of dimension d and length $t_i$ (where the length of each sequence can vary). The output domain $Y=\{+1, -1\}$ contains, without loss of generality, the normal class label +1 (i.e., the class it has learned from) and the abnormal class label −1 (i.e., the class it has never seen before).

For computing the conditional probability distribution $p_w(y|x)$ with some parameter vector w, described further below, a learning objective is:

$$\min_{w,\xi,\rho} L(w) = \frac{\lambda}{2}\|w\|_2^2 + \frac{1}{N}\sum_{i=1}^N \xi_i - \rho \quad (1)$$

$$\text{s.t. } \forall i: \Delta(x_i; w) \geq \rho - \xi_i, \xi_i \geq 0 \quad (2)$$

$$\Delta(x_i; w) = p_w(y_i = +1 | x_i) - p_w(y_i = -1 | x_i) \quad (3)$$

where $\|w\|_2 = \sqrt{\Sigma_l |w_l|^2}$ is an $L_2$ norm and $\xi_i$'s are slack variables that are related to a soft margin, i.e., introduced to measure the degree of misclassification, described above.

As described above, the sequences in the training dataset of the present invention have a higher probability of being normal ($y_i=+1$), while favoring a tight solution space with $L_2$ regularization. This may, in some instances, be at a cost of allowing some of the training sequences to have a margin $\Delta(x_i; w)$ smaller than an offset parameter $\rho \in [0, 1)$. Some embodiments control the tradeoff between these two goals by specifying the minimum margin between the probability of each training sequences being classified as normal or abnormal (regardless of its ground truth label). After a solution (w, ρ) is found, a decision rule for the one-class classifier is set as $$f(x) = \text{sgn}(\Delta(x;w) - \rho) \quad (4)$$

As described above and elsewhere herein, since the learning strategy accepts most (but not necessarily all) of the sequences in the training dataset as positive, some sequences are allowed to be negative, which may make the learned classifier more robust to outliers in the training data.

To obtain $\Delta(x, w)$ the conditional probability distribution $p_w(y|x)$ is computed. In some embodiments a standard formulation of CRF (conditional random fields), a standard machine learning algorithm, may be used, and in other embodiments CRF with latent variables may be used.

The standard CRF formulates the conditional probability distribution $p_w(y|x)$ as $$p_w(y|x) = \frac{\exp\{w^T \cdot \Phi(y, x)\}}{\sum_{y' \in y} \exp\{w^T \cdot \Phi(y', x)\}} \quad (5)$$

where y is a vector of length t, and the feature function $\Phi(y, x)$ is defined as $$\Phi(y, x) = \sum_j \phi(y_j, x) + \sum_{j,k} \phi(y_j, y_k) \quad (6)$$

with singleton features $\phi(y_j, x)$ and pairwise features $\phi(y_j, y_k)$. Specific definitions of the features may depend on applications.

Using CRF, $\Delta(x, w)$ is computed by obtaining $p_w(y|x)$ via Equation 5, taking an average of the marginals $$p_w(y|x) = \frac{1}{t}\sum_{j \in t} p_w(y_j|x),$$

and finally computing the difference $p_w(y_i=+1|x_i) - p_w(y_i=-1|x_i)$.

With this standard CRF formulation, many existing convex optimization algorithms may be used with theoretically sound convergence bounds. However, many real-world problems may not be easily formulated as simple convex optimization problems without forcing a reduction in the expressiveness of the models. In contrast, incorporating latent variables to the model to capture hidden dependence structure in the data, despite making the problem no longer convex, often leads to better performance.

As such, a CRF with a set of latent variables $h \in \mathcal{H}$ may be formulated, as described in "Hidden Conditional Random Fields" by Ariadna Quattoni, Sy Bor Wang, Louis-Philippe Morency, Michael Collins, Trevor Darrell, IEEE Trans. Pattern Anal. Mach. Intell. 29(10): 1848-1852 (2007), and "Conditional Random Fields: Probabilistic Models for Segmenting and Labeling Sequence Data," by John D. Lafferty, Andrew McCallum, Fernando C. N. Pereira, ICML 2001: 282-289. The Quattoni and Lafferty references are hereby expressly incorporated by reference herein in their entireties for all purposes $$p_w(y|x) = \frac{\sum_h \exp\{w^T \cdot \Phi(y, h, x)\}}{\sum_{y' \in y, h} \exp\{w^T \cdot \Phi(y', h, x)\}} \quad (7)$$

where the feature function $\Phi(y, h, x)$ is defined as $$\Phi(y, h, x) = \sum_j \phi(y, h_j, x) + \sum_{j,k} \phi(y, h_j, h_k) \quad (8)$$

with singleton features $\phi(y, h_j, x)$ and pairwise features $\phi(y, h_j, h_k)$.

By using the additional set of latent variables, the model, in some instances, is more expressive (and as a result, the computed $p_w(y|x)$ is more accurate) because, unlike CRFs, each observation within a sequence is allowed to have a different label. This feature is important in sequential anomaly detection, where there may exist several possible descriptions of "normal" sequential patterns.

Regarding optimization, equation (1), described above, may be cast as a regularized risk minimization problem $$\min_w L(w) = \frac{\lambda}{2}\|w\|_2^2 + \frac{1}{N}\sum_{i=1}^N l(x_i, y_i; w) \quad (9)$$

-continued $$l(x_i, y_i; w) = \max\left[0, \log\left(\frac{1+\rho}{1-\rho}\right) - \Gamma(x_i; w)\right] \quad (10)$$

$$\Gamma(x_i; w) = \log\left(\frac{p_w(y_i = +1 \mid x_i)}{p_w(y_i = -1 \mid x_i)}\right) \quad (11)$$

where $l(x_i, y_i; w) \geq 0$ is a hinge loss that penalizes the cases where the constraints in Equation 2, described above, are violated. It is derived from $l(x_i, y_i; w) = \max [0, \rho - \Delta(x_i; w)]$, which may be converted to a log scale for numerical stability. The loss function is undefined, in some instances, when $p_w(y_i|x_i)$ is 0 or 1. In some embodiments the loss function is in the range of an open bounded interval (0, 1).

To solve Equation 9, a bundle method may be used, which converges to a solution with accuracy $\epsilon$ at the rate $O(1/\epsilon)$ for general non-differentiable convex problems. In some embodiments, the hinge loss is non-differentiable at the hinge point. The method for solving the regularized risk minimization problem aims at iteratively building an increasingly accurate piece-wise quadratic lower bound of L(w) based on its subgradient $\partial_w L(w)$. The subgradient of $l(x_i, y_i; w)$ is obtained as $$\partial_w l(x_i, y_i; w) = -\partial_w \Gamma(x_i; w) \quad (12)$$

The specific form of $\partial_w \Gamma(x_i; w)$ depends on whether Equation 5 or Equation 7 is used to compute $p_w(y|x)$. For the former case $$\partial_w \Gamma(x_i; w) = \Phi(+1, x) - \Phi(-1, x) \quad (13)$$

and for the latter case, $$\partial_w \Gamma(x_i; w) = \alpha(+1) - \alpha(-1) \quad (14)$$

$$\alpha(y') = \sum_h \mathbb{E}_{h \sim p_w(h|y', x)}[\Phi(y', h, x)]$$

Since one or more embodiments are interested in time-series data as input, the underlying graph structure is, in some embodiments, restricted as a linear chain, and an efficient exact inference algorithm is used, such as belief propagation, to obtain the marginal probabilities $p_w(y|x)$ and $p_w(h|y, x)$.

Figure 3:
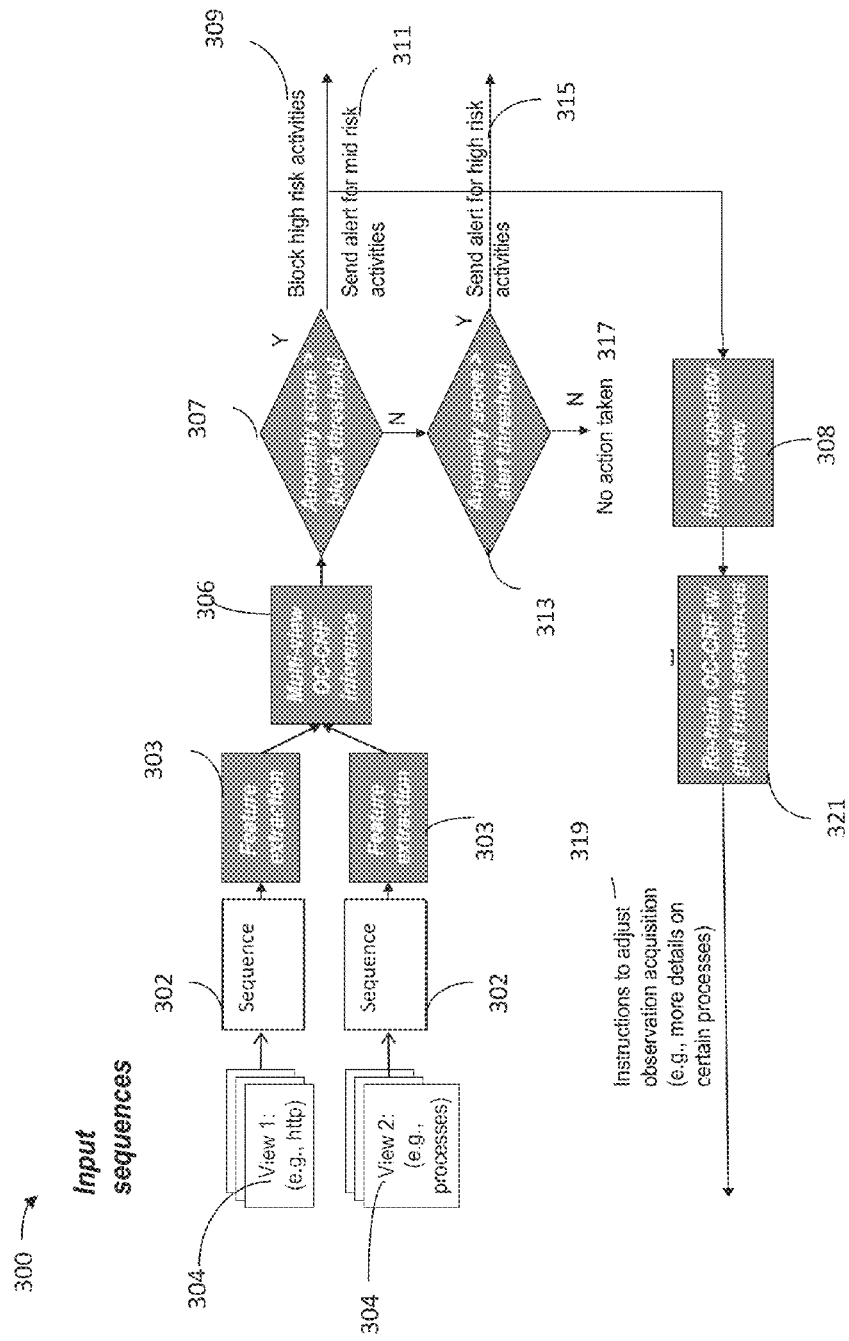
FIG. 3 is a block diagram depicting details of an exemplary system, according to an aspect of the invention.
Figure 4:
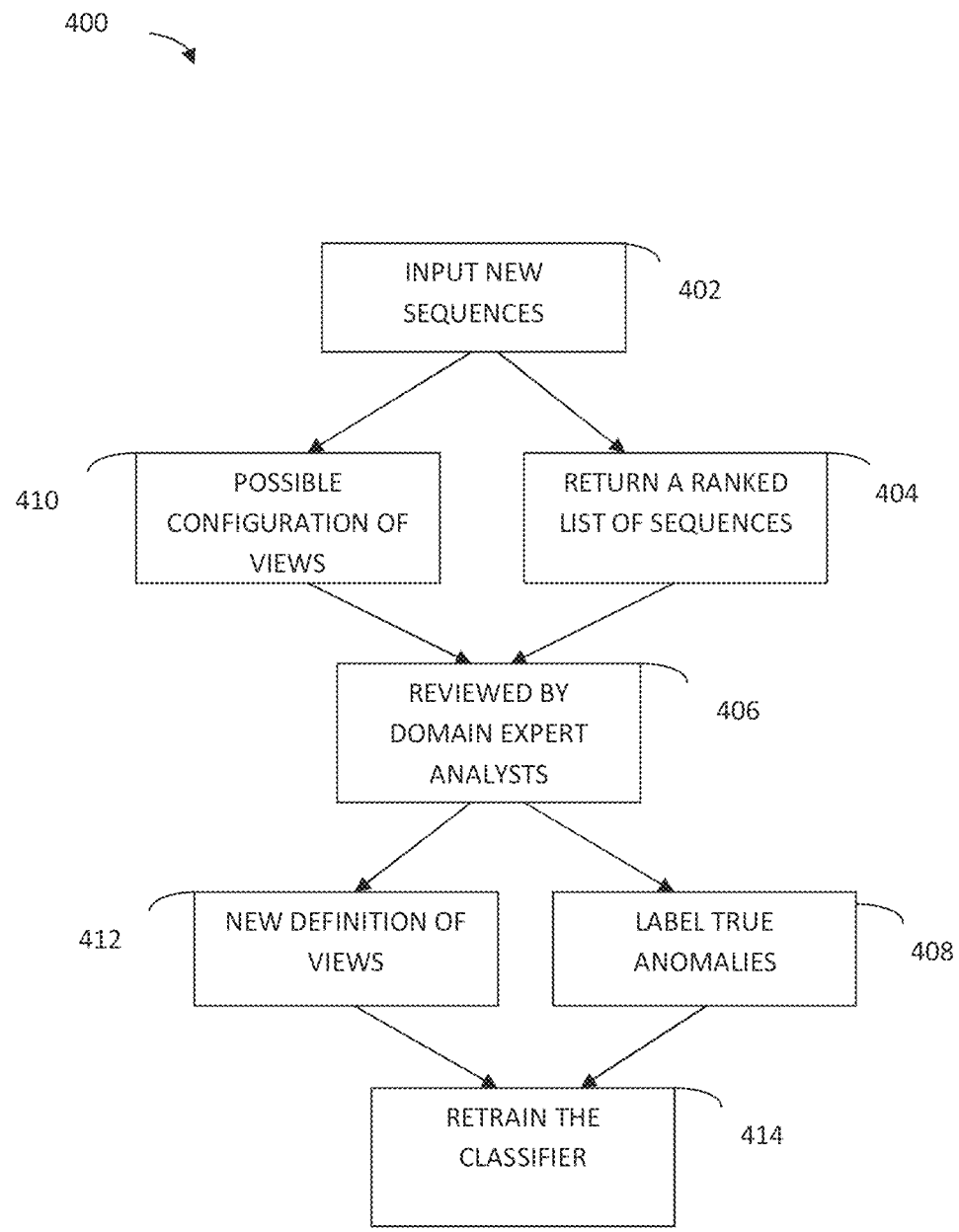
FIG. 4 is a flow chart depicting details of the operation of the system in FIG. 3, according to an aspect of the invention.

Turning to FIGS. 3 and 4, an exemplary multi-view one-class temporal dynamic sequence anomaly detection system 300 based on active learning is depicted in FIG. 3, with a flow chart of corresponding method steps in FIG. 4. The exemplary system 300 includes two types of dynamic sequence data sources 302—hypertext transfer protocol (http) related data sources and computer process related data sources. While two types are shown herein by way of example, more or fewer data sources may be used in other cases (e.g., email contents, time logs, enterprise network graph features, etc.). In at least some cases, a set of relevant features exists for each dataset, and considering the relationship across different sets of features is helpful for improving the learning algorithm used in active learning. Note feature extraction 303.

Initially, during a configuration process, the sequences in the data source 302 may be segmented based on features relative to that data, and those features may be extracted to form "views" of the dataset. In some embodiments, the initial definition of "views" or view groups for the segmentation is generated by an artificial intelligence (AI) algorithm or a human expert. These initial definitions/views, in some instances, are examined and refined by a human expert, as will be further described below. The human expert, in some instances, reviews the performance of the anomaly detection when examining the quality of the view groups. Each "view" may include a set or group of relevant features (e.g., time-related, graph-related, worldwide web (www)-related, file-related). Other suitable relevant features may be used. In the example shown herein, the data source is segmented such that time-related features of each data source are extracted to form a respective view 304, for example. The length of the time of the sequences may vary, but the duration of the segment is synchronized across views. For example, if the length of time of a first sequence is from 12 AM to 3 AM, and the length of time of a second sequence is from 11 PM to 3 AM, the length of time of the sequences is varied. The view of the first and second sequences, however, is taken from 1 AM to 3 AM, such that the duration of the segment is synchronized across views The exemplary system 300 includes a multi-view one-class learning algorithm (multi-view OC-CRF) 306. In some embodiments, the learning algorithm 306 suggests a possible definition of views, i.e. which features to group together, thereby organizing one or more features of the temporal sequences of the data source into multiple views. In some embodiments, the learning algorithm 306 is adapted to learn a classifier, whereby the learning algorithm is a function that obtains an input as training data, and the output of the algorithm is the classifier, as described above with respect to FIGS. 1 and 2. In other embodiments, the learning algorithm 306 is adapted to statistically learn a classifier by refining the classifier learned in FIG. 2 above, for example, with the defined configuration of views using multi-view learning; classifying one or more temporal event sequences of the data source with the refined classifier; receiving user input regarding the automatic classification by algorithm 306 of one or more temporal event sequences of the data source as having a negative label; and generating one or more suggestions to adjust view configurations based on classification results of the refined classifier. In one or more embodiments, this process is re-iterated until a termination criterion is satisfied.

In operation, in one or more embodiments, the pre-trained one class sequence classifier of the learning algorithm 306 is used to assess the sequences from each data source 302 in Step 402 of a method 400, and return a ranked list of sequences in Step 404. In at least some embodiments, the algorithm 306 determines that the rank or anomaly score of a given sequence is greater than a particular threshold value and thereby suspicious of being an anomaly. In one or more instances, the type of threshold and rank determine the action taken. For example, if the threshold is a "block" threshold 307, for a score above the highest threshold, the algorithm indicates that the event, occurrence, and/or activity is high risk and should be blocked 309. For a score below this highest threshold (mid-risk activities and/or events), the algorithm activates an alert 311. Additionally, or alternatively, if the score is less than a "block" threshold, the algorithm 306 determines whether the score is greater than an "alert" threshold 313. If, for example, the score is less than a "block" threshold, but greater than an "alert" threshold, the algorithm activates an alert for what may be classified a "high risk" activity and/or event 315. If, on the other hand, the score is less than a "block" threshold and less than an "alert" threshold, no action is taken 317. As shown at 408, in one or more embodiments, one or more domain experts 308 analyze the list of suspicious sequences in step 406 and label one or more of them as true anomalies in step 408. In some embodiments, the domain experts analyze less than all of the suspicious sequences. For example, the domain experts may only analyze those suspicious sequences classified as "high risk." In some iteration, there may be no suspicious sequences. In some embodiments the domain experts are human. Other suitable domain experts may be used (e.g., artificial intelligence techniques). In some embodiments, initial view groups are generated automatically by an artificial intelligence (AI) technique. These initial view groups are then examined and refined by a human expert. As described above, "views" of the dataset may be formed during a configuration process and, in step 410, based on the classifier's assessment of the sequence, the learning algorithm 306 suggests a new possible definition or configuration of views to the domain experts 308. In some embodiments the new definition of views is different from the one determined at configuration. In some embodiments, the learning algorithm 306 suggests one definition of views for each iteration of the steps. In some embodiments, generating a new possible definition or configuration of views is carried out by using canonical correlation analysis. Other suitable analyses may be used. For example, in some instances, the algorithm 306 first computes Person's correlation coefficient between view V1 and V2 as:

$$r_{V1,V2} = \frac{\text{COV}(V1, V2)}{\sigma_{V1}\sigma_{V2}} = \frac{E[(V1 - \mu_{V1})(V1 - \mu_{V1})]}{\sigma_{V1}\sigma_{V2}}$$

where V1 and V2 are one of N randomly selected combination of features. Then, the algorithm 306 returns the combination with the highest correlation as the optimal view configuration.

In some cases, the domain experts 308 refine the proposed definition of views to better associate different features across the datasets, as seen in step 412. In some embodiments, the domain experts 308 may instruct the system 300 to adjust the observation and/or event acquisition to obtain more or fewer details on certain processes, for example 319. This adjustment may be based in part on ground (gnd) truth sequences, which are sequences that the domain experts 308 are confident of their labels (e.g., sequences the experts know are positive or negative, instead of assuming they are positive or negative) 321. Then in step 414, the system 300 retrains or refines the classifier using the new definition of views and the newly labeled true anomaly data, as will be described further below with respect to FIG. 5. In some embodiments, during re-training, a relative weight of the "true anomaly" or negatively labeled sequences is relatively higher than the weight of all of the sequences in the first dataset via distribution-sensitive learning, as described in "Distribution-Sensitive Learning for Imbalanced Datasets," by Yale Song, Louis-Philippe Morency and Randall Davis in IEEE International Conference on Automatic Face and Gesture Recognition (FG), 2013, which is hereby incorporated by reference herein in its entirety for all purposes. In distribution-sensitive learning, more weight is given to samples from an underrepresented class, allowing all of the samples in the dataset to have a balanced impact in the learning process. In some embodiments, the relative weight of the "true anomaly" labeled sequences is inversely proportional to a distribution of the sequences in the first dataset. In some embodiments, after the classifier is retrained, the method 400 returns to the Step 404 to test the sequences against the retrained classifier.

As described above, in some embodiments it is desirable to keep the learning independent of a highly imbalanced dataset (e.g., via distribution sensitive prior). To this end, in some embodiments, the system 300 reformulates the original objective value, described above with respect to FIG. 2 and the enforcement described in step 210, such that the risk term is normalized over class-specific dataset size, i.e., $$L(w) = \frac{\lambda}{2}\|w\|^2 - \frac{1}{N^+}\sum_{i=1}^{N^+}\Delta_i - \frac{1}{N^-}\sum_{i=1}^{N^-}\overline{\Delta}_i,$$

where $N^+(N^-)$ is the number of normal (abnormal) sequences and $\overline{\Delta}_i = \rho - (p(\text{abnormal}|x_i) - p(\text{normal}|x_i))$. This aspect advantageously keeps the learning independent of a highly imbalanced dataset. The benefit of this is that it allows the effect of different classes to be relatively the same in imbalanced data.

Figure 5:
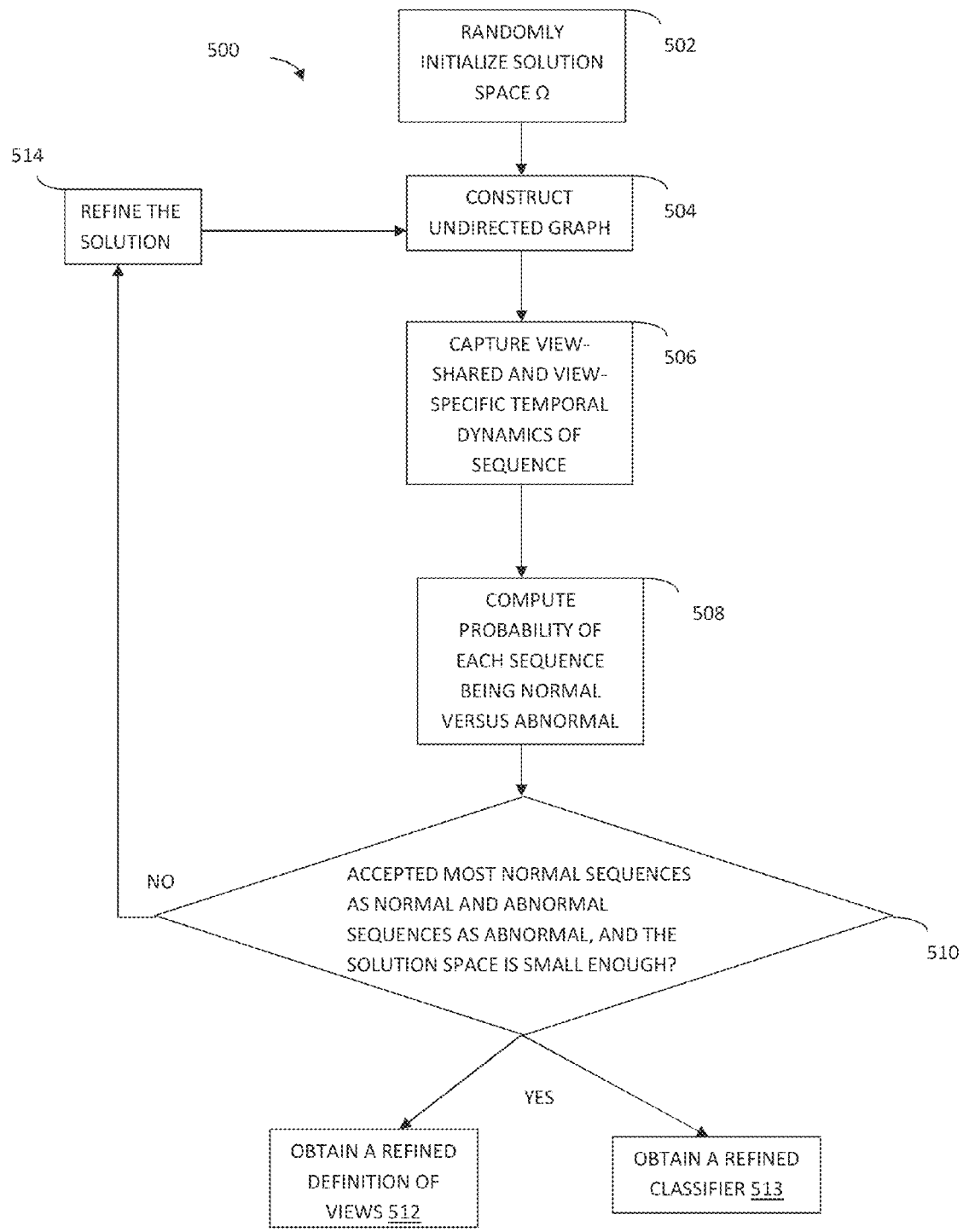
FIG. 5 is still another flow chart depicting details of an exemplary method, according to an aspect of the invention.

FIG. 5 shows a method 500 of retraining the classifier using a new definition of views (V) and newly labeled true anomaly sequences. In step 502, the solution space Ω is randomly initialized. Then in step 504, for each sequence an undirected graph is constructed using the new definition of views with additional latent random variables, where each variable is associated with each observation and/or event from each view. A posterior distribution of the latent variables is statistically inferred in step 506, capturing view-shared and view-specific dynamics. Then, the probability of each sequence being normal versus abnormal is computed in step 508 by marginalizing over the posterior distribution. In step 510, if most normal sequences were accepted as normal and abnormal sequences accepted as abnormal, and the solution space is small enough, a refined definition of views may be obtained in Step 512, and a refined classifier 308 may be obtained in Step 513. In step 510, if most normal sequences were not accepted as normal and abnormal sequences were not accepted as abnormal, and the solution space is not small enough, the solution is refined in Step 514, which returns the method 500 back to Step 504. In some embodiments, after a user-defined number of iterations, a solution is not found and most sequences are not accepted as normal.

Given the discussion thus far, it will be appreciated that, in general terms, an exemplary method, according to an aspect of the invention, includes collecting a dataset including at least one temporal event sequence (e.g., with a data collection module described elsewhere herein); learning statistically a one-class sequence classifier f(x) that obtains a decision boundary (e.g., with an optimization engine module described elsewhere herein); evaluating at least one new temporal event sequence (e.g., with an evaluation engine module described elsewhere herein), wherein the at least one new temporal event sequence is outside of the data set; and determining whether the at least one new temporal event sequence is one of a normal sequence or an abnormal sequence based on the evaluating step (e.g., with an analysis module described elsewhere herein). In some instances, the at least one temporal event sequence of the dataset is unlabeled. In some embodiments, evaluating the new temporal event sequence uses the learned classifier to compute a probabilistic distance of the new temporal event sequence to the decision boundary.

In some embodiments, the method may also include reviewing an automatic classification of at least one of the one or more temporal event sequences in the dataset as abnormal; receiving a user inputted label of "true anomaly" for at least one of the reviewed automatically classified sequences; adding the "true anomaly" labeled sequences to the dataset; and re-training the classifier using the dataset including the "true anomaly" labeled sequences. During the re-training, in some instances, a relative weight of the "true anomaly" labeled sequences is higher than a weight given to other sequences in the dataset by distribution-sensitive learning. In some embodiments, the relative weight of the "true anomaly" labeled sequences is inversely proportional to a distribution of the sequences in the dataset.

In some cases, steps are provided for learning the classifier. An example of such steps includes randomly initializing a solution space ($\Omega$); constructing an undirected graph for the at least one temporal event sequence in the dataset; capturing at least one temporal dynamic of the at least one temporal event sequence of the dataset; computing the probability of the at least one temporal event sequence of the dataset having a normal sequence or an abnormal sequence; and refining the classifier. In some instances, the dataset further includes latent random variables, wherein each latent random variable is associated with each event in the sequence. The steps described above for learning the classifier are, in some instances, repeated until a termination criterion is satisfied. To satisfy a termination criterion, most datasets are forced to have a higher probability of having a normal sequence while keeping a solution vector of the solution space ($\Omega$) with a small norm as compared to a user defined parameter.

In some embodiments, steps are provided for statistically learning the one-class classifier. An example of such steps includes defining at least one view configuration adapted to organize at least one feature of the at least one temporal event sequence of the dataset into multiple views; refining the classifier with at least one of the defined configuration of views using multi-view learning; classifying the at least one new temporal sequence with the refined classifier; receiving user input regarding automatic classification of the at least one temporal event sequence of the dataset with the refined classifier, the at least one temporal event sequence of the dataset having a negative label; and generating at least one suggestion to adjust the at least one view configuration based on classification results of the refined classifier.

In another aspect, a computer program product includes a computer readable storage medium having computer readable program code embodied therewith. The computer readable program code includes computer readable program code configured to: collect a dataset including at least one temporal event sequence; learn statistically a one-class sequence classifier f(x) that obtains a decision boundary; evaluate at least one new temporal event sequence, wherein the at least one new temporal event sequence is outside of the data set; and determine whether the at least one new temporal event sequence is one of a normal sequence or an abnormal sequence based on the evaluating step. The computer readable medium, in some cases, includes the distinct software modules described elsewhere herein.

In still another aspect, an exemplary apparatus includes a memory; and at least one processor, coupled to the memory, and operative to: collect a dataset including at least one temporal event sequence; learn statistically a one-class sequence classifier f(x) that obtains a decision boundary; evaluate at least one new temporal event sequence, wherein the at least one new temporal event sequence is outside of the data set; and determine whether the at least one new temporal event sequence is one of a normal sequence or an abnormal sequence based on the evaluating step. In some instances, the at least one temporal event sequence of the dataset is unlabeled. In some embodiments, a probabilistic distance of the new temporal event sequence to the decision boundary is computed with the learned classifier to evaluate the at least one new temporal event sequence. In some embodiments, the at least one processor is operative to automatically classify at least one of the one or more temporal event sequences in the dataset as abnormal. Further, in some embodiments, the at least one processor is operative to receive a user inputted label of "true anomaly" for at least one of automatically classified sequences, and is operative to re-train the classifier using the dataset including the "true anomaly" labeled sequences.

The apparatus in some embodiments, further includes a plurality of distinct software modules embodied on a computer-readable storage medium, as described elsewhere herein.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
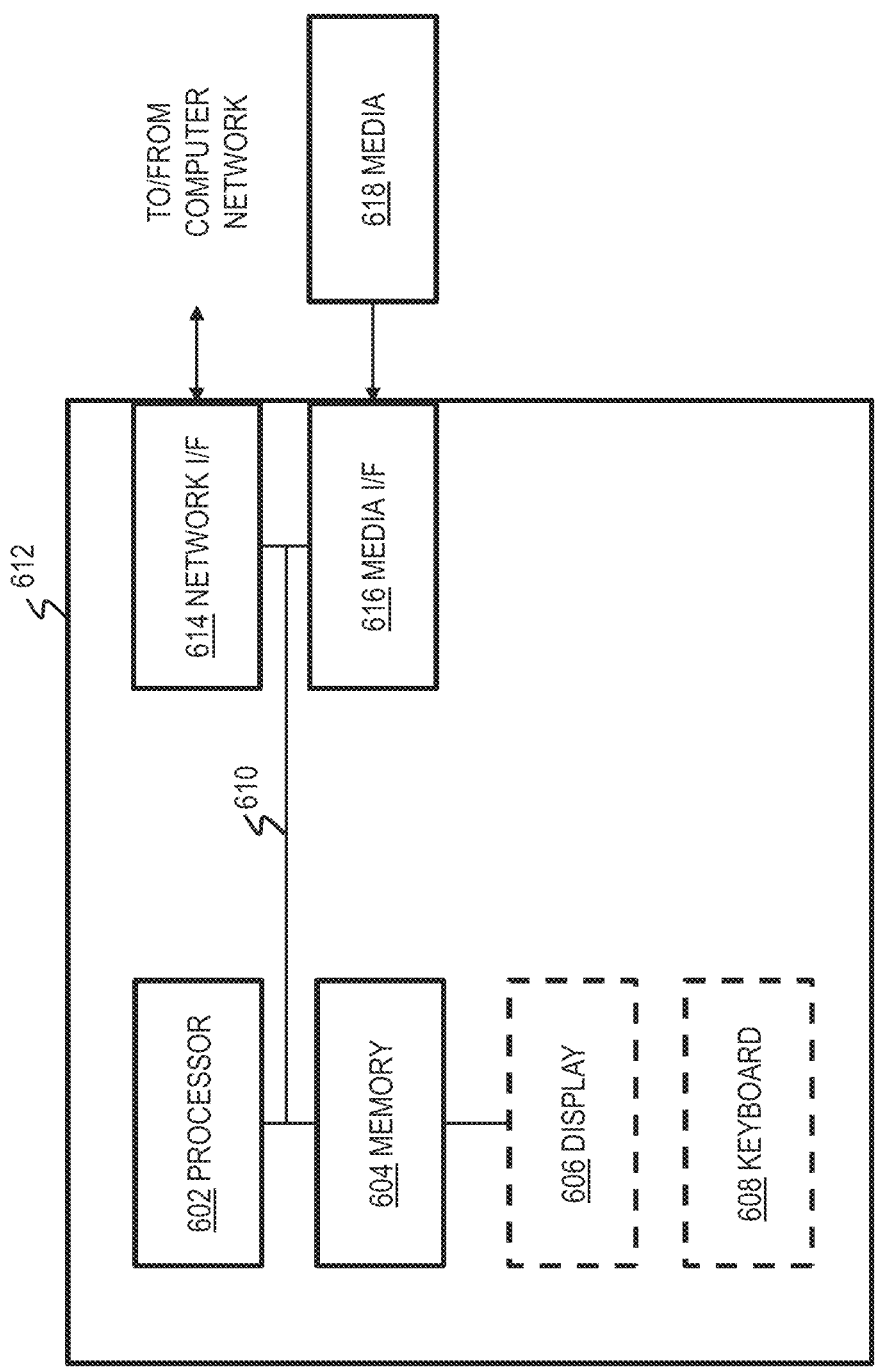
FIG. 6 depicts a computer system that may be useful in implementing one or more aspects and/or elements of the invention.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a data collection module (e.g., which collects required data by interfacing with software agents on remote machines to be monitored), an optimization engine module (e.g. code to solve equation (9)), an evaluation engine module (e.g., code to solve equation (4)), and an analysis module (e.g., code to sort by descending anomaly score, as described elsewhere herein). The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    collecting a first computer process related dataset comprising a plurality of normal temporal event sequences;
    learning, using the first computer process related dataset, a one-class sequence classifier f(x) that obtains a decision boundary configured to label temporal event sequences;
    collecting a second computer process related dataset comprising at least one new temporal event sequence; and
    evaluating the at least one new temporal event sequence using the decision boundary to label the at least one new temporal event sequence as an abnormal sequence, causing a computer system to issue an alert,
    wherein learning the classifier learning comprises:
        randomly initializing a solution space ($\Omega$);
        constructing an undirected graph for the normal temporal event sequences in the first computer process related dataset;
        capturing at least one temporal dynamic of the normal temporal event sequences of the first computer process related dataset;
        assigning labels to each of the normal temporal event sequences of the first computer process related dataset by computing, for each of the normal temporal event sequences a probability that the at least one normal temporal event sequence of the first computer process related dataset is a normal sequence or an abnormal sequence, wherein at least one of the at least one normal temporal event sequences is labeled as an abnormal sequence; and
        refining the classifier using the plurality of normal temporal event sequences of the first computer process related dataset with respective labels.

2. The method of claim 1, wherein the normal temporal event sequences of the first computer process related dataset are unlabeled.

3. The method of claim 1, wherein evaluating the new temporal event sequence uses the learned classifier to compute a probabilistic distance of the new temporal event sequence to the decision boundary.

4. The method of claim 1, wherein the first computer process related dataset further comprises latent random variables, and wherein each latent random variable is associated with each event in the sequence.

5. The method of claim 1, further comprising:
    repeating the steps for learning the classifier until a termination criterion is satisfied.

6. The method of claim 5, wherein repeating the steps for learning the classifier until the termination criterion is satisfied further comprises:
    enforcing, using a user defined parameter, a plurality of the datasets to have a higher probability of having a normal sequence, while keeping a solution vector of the solution space ($\Omega$) small as compared to a number of normal sequences.

7. The method of claim 1, further comprising:
    reviewing an automatic classification of at least one of the normal temporal event sequences in the first computer process related dataset as abnormal;
    receiving a user inputted label of "true anomaly" for at least one of the reviewed automatically classified sequences;
    adding the "true anomaly" labeled sequences to the first computer process related dataset; and re-training the classifier using the first computer process related dataset including the "true anomaly" labeled sequences.

8. The method of claim 7, wherein during the re-training, a relative weight of the "true anomaly" labeled sequences is higher than a weight given to other sequences in the first computer process related dataset by distribution-sensitive learning.

9. The method of claim 8, wherein the relative weight of the "true anomaly" labeled sequences is inversely proportional to a distribution of the sequences in the first computer process related dataset.

10. The method of claim 1, wherein learning the one-class classifier further comprises:
defining at least one view configuration organizing at least one feature of the normal temporal event sequences of the first computer process related dataset into multiple views;
refining the classifier with at least one of the defined configuration of views using multi-view learning;
determining an automatic classification of the at least one new temporal event sequence with the refined classifier, wherein the automatic classification is a negative label;
receiving user input regarding the automatic classification of the at least one new temporal event sequence, the user input updating a negative label of the at least new temporal event sequence to a positive label; and
generating at least one suggestion to adjust the at least one view configuration based on classification results of the refined classifier.

11. The method of claim 1, further comprising providing a system, wherein the system comprises distinct software modules, each of the distinct software modules being embodied on a computer-readable storage medium, and wherein the distinct software modules comprise a data collection module, an optimization engine module, an evaluation engine module, and an analysis module;
wherein:
said dataset collection is carried out by said data collection module executing on at least one hardware processor;
said classifier learning is carried out by said optimization engine module executing on said at least one hardware processor;
said evaluating is carried out by said evaluation engine module executing on said at least one hardware processor; and
said determining is carried out by said analysis module executing on said at least one hardware processor.

12. A computer program product comprising a non-transitory computer readable storage medium having computer readable program code embodied therewith, said computer readable program code comprising:
computer readable program code configured to:
collect a dataset comprising a plurality of normal temporal event sequences;
learn, using the dataset, a one-class sequence classifier f(x) that obtains a decision boundary labeling each temporal event sequence;
evaluate, using the decision boundary, at least one new temporal event sequence, wherein the at least one new temporal event sequence is outside of the dataset; and
determine that the at least one new temporal event sequence is an abnormal sequence based on the evaluating step, causing an alert to be issued,
wherein the computer readable program code configured to learn the classifier learning comprises computer readable program code configured to:
randomly initialize a solution space ($\Omega$);
construct an undirected graph for the normal temporal event sequences in the dataset;
capture at least one temporal dynamic of the normal temporal event sequences of the dataset;
assign labels to each of the normal temporal event sequences of the dataset by computing, for each of the normal temporal event sequences a probability that the at least one normal temporal event sequence of the dataset is a normal sequence or an abnormal sequence, wherein at least one of the at least one normal temporal event sequences is labeled as an abnormal sequence; and
refine the classifier using the plurality of normal temporal event sequences of the dataset with respective labels.

13. An apparatus comprising:
a memory; and
at least one processor, coupled to said memory, and operative to:
collect a dataset comprising a plurality of normal temporal event sequences;
learn, using the plurality of normal temporal event sequences, a one-class sequence classifier f(x) that obtains a decision boundary labeling each temporal event sequence;
evaluate, using the decision boundary, at least one new temporal event sequence, wherein the at least one new temporal event sequence is outside of the dataset; and
determine that the at least one new temporal event sequence is an abnormal sequence based on the evaluating step, causing an alert to be issued,
wherein the processor in learning the one-class sequence classifier f(x) is operative to:
randomly initialize a solution space ($\Omega$);
construct an undirected graph for the normal temporal event sequences in the dataset;
capture at least one temporal dynamic of the normal temporal event sequences of the dataset;
assign labels to each of the normal temporal event sequences of the dataset by computing, for each of the normal temporal event sequences a probability that the at least one normal temporal event sequence of the dataset is a normal sequence or an abnormal sequence, wherein at least one of the at least one normal temporal event sequences is labeled as an abnormal sequence; and
refine the classifier using the plurality of normal temporal event sequences of the dataset with respective labels.

14. The apparatus of claim 13, wherein the temporal event sequences of the dataset are unlabeled.

15. The apparatus of claim 13, wherein a probabilistic distance of the new temporal event sequence to the decision boundary is computed with the learned classifier to evaluate the at least one new temporal event sequence.

16. The apparatus of claim 13 wherein the at least one processor is operative to automatically classify the at least one temporal event sequence in the dataset as abnormal.

17. The apparatus of claim 16, wherein the at least one processor is operative to receive a user inputted label of "true anomaly" for at least one of automatically classified sequences.

18. The apparatus of claim 17, wherein the at least one processor is operative to re-train the classifier using the dataset including the "true anomaly" labeled sequences.

19. The apparatus of claim 13, further comprising a plurality of distinct software modules, each of the distinct software modules being embodied on a computer-readable storage medium, and wherein the distinct software modules comprise a data collection module, an optimization engine module, an evaluation engine module, and an analysis module;

wherein:
said at least one processor is operative to collect said dataset by executing said data collection module;
said at least one processor is operative to learn said classifier by executing said optimization engine module;
said at least one processor is operative to evaluate said sequence by executing said evaluation engine module; and
said at least one processor is operative to determine whether the at least one new temporal event sequence is one of a normal sequence or an abnormal sequence by executing said analysis module.

\* \* \* \* \*